United States Patent
Kisanuki et al.

(10) Patent No.: US 8,675,350 B2
(45) Date of Patent: Mar. 18, 2014

(54) GAS INSULATED SWITCHGEAR

(75) Inventors: Osamu Kisanuki, Tokyo (JP); Takashi Miyamoto, Tokyo (JP); Takao Tsurimoto, Tokyo (JP); Manabu Yoshimura, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 405 days.

(21) Appl. No.: 13/079,903

(22) Filed: Apr. 5, 2011

(65) Prior Publication Data
US 2011/0299227 A1 Dec. 8, 2011

(30) Foreign Application Priority Data
Jun. 4, 2010 (JP) ................................. 2010-129263

(51) Int. Cl.
*H02B 7/00* (2006.01)

(52) U.S. Cl.
USPC .......... 361/612; 361/604; 361/619; 174/15.1; 218/155

(58) Field of Classification Search
None
See application file for complete search history.

(56) References Cited

U.S. PATENT DOCUMENTS

| | | | |
|---|---|---|---|
| 7,733,654 B2 * | 6/2010 | Wang et al. | 361/710 |
| 8,081,464 B2 * | 12/2011 | Mauroux et al. | 361/703 |
| 8,243,453 B2 * | 8/2012 | Van Dijk et al. | 361/713 |
| 2010/0134957 A1 * | 6/2010 | Tsurimoto et al. | 361/612 |
| 2010/0265635 A1 * | 10/2010 | Yoshimura et al. | 361/612 |

FOREIGN PATENT DOCUMENTS

| | | |
|---|---|---|
| JP | 7-245853 A | 9/1995 |
| JP | 11-144573 A | 5/1999 |
| JP | 2002-218612 A | 8/2002 |

OTHER PUBLICATIONS

Office Action with a partial English Translation dated Jul. 2, 2013, issued by the Chinese Patent Office in the corresponding Chinese Patent Application No. CN1178348C with an English Abstract.

* cited by examiner

*Primary Examiner* — Courtney Smith
(74) *Attorney, Agent, or Firm* — Buchanan Ingersoll & Rooney PC

(57) ABSTRACT

A gas insulated switchgear includes: a center conductor that is arranged to extend horizontally in a tank; a cylindrical member that is arranged in the tank to surround a center conductor, and formed by curving a metal plate-like member into a cylindrical shape and then joining circumferentially opposed both ends of the plate-like member by welding to form a welding portion, the welding portion being located on a lower side of the cylindrical member; and a current transformer for instruments, through which the cylindrical member is inserted, the current transformer being supported by the cylindrical member, and being arranged to surround the center conductor. The welding portion includes a metal spacer sandwiched between the circumferentially opposed both ends of the plate-like member, and the spacer and the ends are welded to each other.

2 Claims, 6 Drawing Sheets

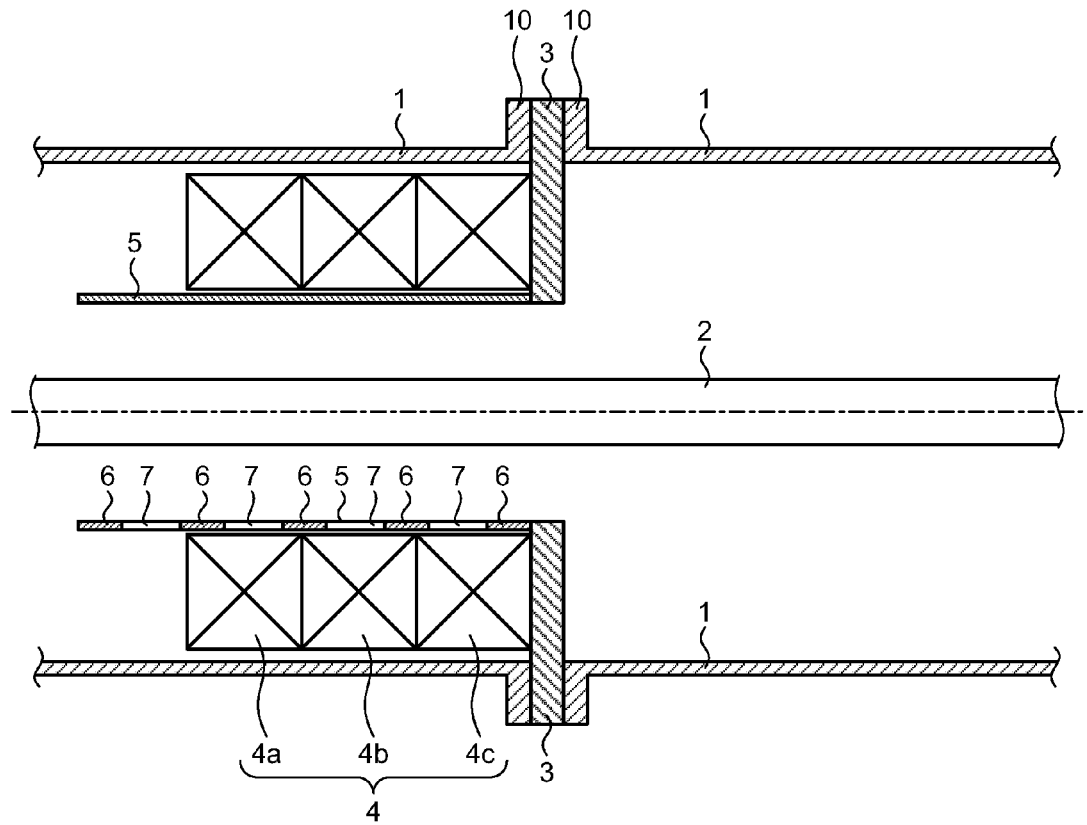
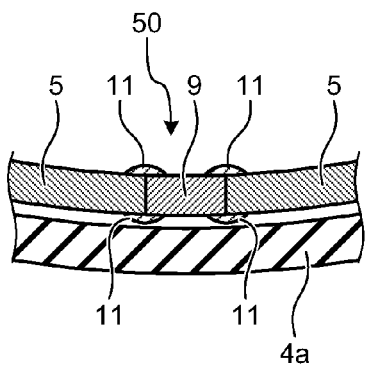

GAS INSULATED SWITCHGEAR

BACKGROUND OF THE INVENTION

1. Field of the Invention

The present invention relates to a gas insulated switchgear, and more particularly to a gas insulated switchgear having a trapping unit that traps metal foreign matters.

2. Description of the Related Art

A gas insulated switchgear is configured such that various devices such as a breaker, bus lines, a disconnector, and a current transformer for instruments are accommodated in a tank enclosing insulation gas such as $SF_6$ (sulfur hexafluoride) gas.

Meanwhile, metal foreign matters are mixed in the content of a tank of a gas insulated switchgear in some cases. The metal foreign matters are moved by an electric field in the tank, and this can be a cause for deteriorating the insulation performance of the switchgear. Therefore, it is desired to eliminate or trap the metal foreign matters.

For example, Japanese Patent Application Laid-open No. H07-245853 discloses a gas insulated electrical device, in which a groove is formed in an inner peripheral surface of a flange that mounts an insulation spacer. Because the groove forms a low electric field portion, metal foreign matters fall into the groove and thus these matters are rendered harmless.

However, because the conventional technique of Japanese Patent Application Laid-open No. H07-245853 requires performing a groove machining on a flange, which is a portion of a tank, the cost increases.

SUMMARY OF THE INVENTION

A gas insulated switchgear according to an aspect of the present invention includes: a metal container enclosing insulation gas; a center conductor through which a current flows, the center conductor being arranged to extend horizontally in the metal container; a cylindrical member being arranged in the metal container to surround the center conductor, and formed by curving a metal plate-like member into a cylindrical shape and then joining circumferentially opposed both ends of the plate-like member by welding the ends to each other to form a welding portion, the welding portion being located on a lower side of the cylindrical member; a support member on which one axial direction end of the cylindrical member is mounted, the support member being fixed to the metal container to support the cylindrical member; and a cylindrical device that has the cylindrical member inserted therein and is supported by the cylindrical member, and is arranged to surround the center conductor, wherein openings are formed on the cylindrical member by the welding portion or a groove is formed on a surface, which is on a side of the center conductor, of the cylindrical member by the welding portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A is a horizontal sectional view of a portion shown with P in FIG. 1, and FIG. 3B is a horizontal sectional view of a portion shown with Q in FIG. 1;

FIG. 4 is a vertical sectional view of another configuration example of the gas insulated switchgear according to the first embodiment;

FIG. 5 is a configuration diagram of a welding portion of a gas insulated switchgear according to a second embodiment of the present invention, corresponding to the portion shown with P in FIG. 1;

DETAILED DESCRIPTION OF THE PREFERRED EMBODIMENTS

Exemplary embodiments of a gas insulated switchgear according to the present invention will be explained below in detail with reference to the accompanying drawings. The present invention is not limited to the embodiments.

Figure 1:
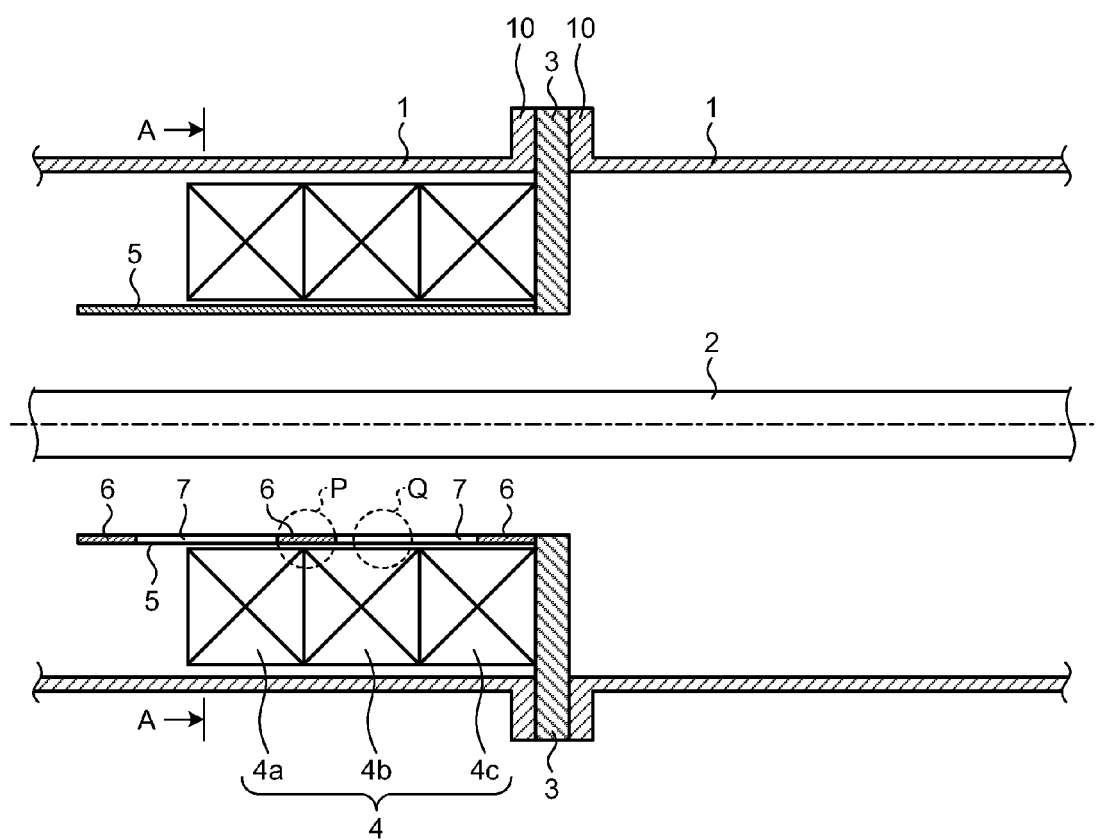
FIG. 1 is a vertical sectional view of a configuration example of a gas insulated switchgear according to a first embodiment of the present invention.
Figure 2:
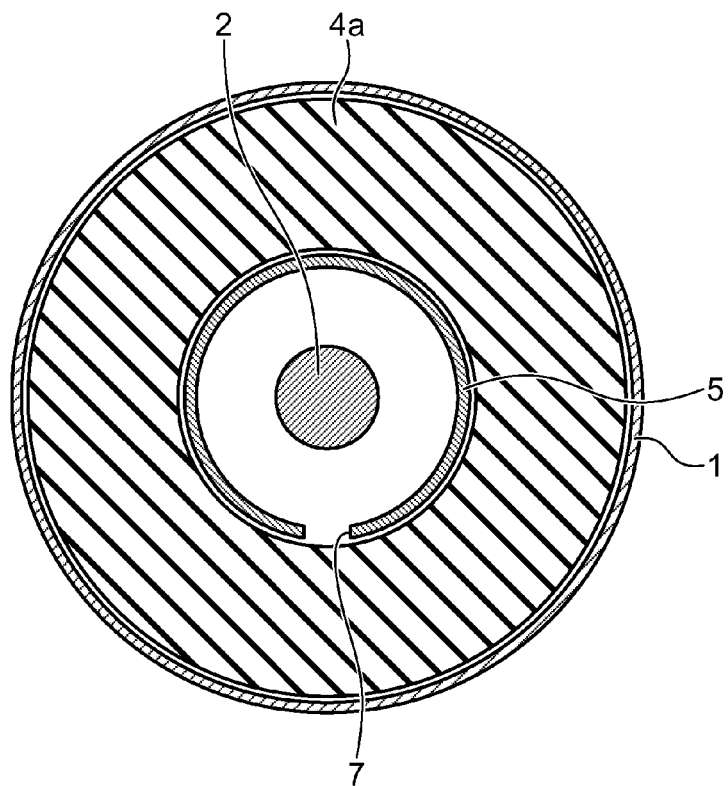
FIG. 2 is a horizontal sectional view taken along a line A-A in FIG. 1.

FIG. 1 is a vertical sectional view of a configuration example of a gas insulated switchgear according to the first embodiment, and FIG. 2 is a horizontal sectional view taken along a line A-A in FIG. 1.

As shown in FIGS. 1 and 2, the gas insulated switchgear according to the first embodiment includes a tank 1, a center conductor 2, a support member 3, a current transformer 4 for instruments, and a cylindrical member 5.

The tank 1 is a grounded cylindrical metal container, and insulation gas such as $SF_6$ gas is enclosed in the tank. The tank 1 is arranged such that the axis thereof extends horizontally, for example. The center conductor 2 is connected to a breaker (not shown), and a current flows through the center conductor 2 in a state where the breaker is closed. The center conductor 2 extends horizontally along the axis of the tank 1, for example.

The cylindrical member 5 is a cylindrical metal member or the like, and is arranged to surround the center conductor 2. The axis of the cylindrical member 5 and the axis of the center conductor 2 may match each other, and the center conductor 2 penetrates the cylindrical member 5 in its axial direction. One end of the cylindrical member 5 in its axial direction is attached to the support member 3. The support member 3 is a ring-like metal member or the like, and an outer peripheral edge thereof is sandwiched between flanges 10, and is fixed to the tank 1 through bolts, for example.

The current transformer 4 for instruments includes three ring-like cores 4a to 4c, for example, and is supported by the cylindrical member 5 that is a casing of the current transformer for instruments. That is, the current transformer 4 for instruments is mounted on the cylindrical member 5 such that the cylindrical member 5 is inserted into the current transformer 4 for instruments. The current transformer 4 for instruments is mounted on the support member 3 through bolts (not shown), for example. The cores 4a to 4c are formed by winding coils around iron cores, and they are arranged in the axial direction of the center conductor 2 to surround the center conductor 2. The number of cores is not limited to the example shown in the drawings. The current transformer 4 for instruments surrounds the center conductor 2, outputs an induced current caused by a current flowing through the center conductor 2, and measures the magnitude of a current flowing through the center conductor.

The cylindrical member 5 has welding portions 6 arranged, for example, at three locations of a lower portion of the cylindrical member 5 along its axial direction. Openings 7 are formed between the adjacent welding portions 6. The cylindrical member 5 is formed in such a manner that a metal plate-like member is curved into a cylindrical shape, circumferentially opposed both ends of the plate-like member are butted against each other, and they are welded to each other at the three locations. At that time, the opposed both ends of the plate-like member are welded to each other such that a distance between the both ends is held and they are substantially in parallel to each other in the axial direction. Therefore, each of the openings 7 formed in the side surface of the cylindrical member 5 has substantially a constant width in the circumferential direction, and has a rectangular shape that is long in the axial direction, for example. It is preferable in terms of strength that the welding portions 6 are formed at both ends and at a central portion of the cylindrical member 5 in the axial direction.

Figure 3A:
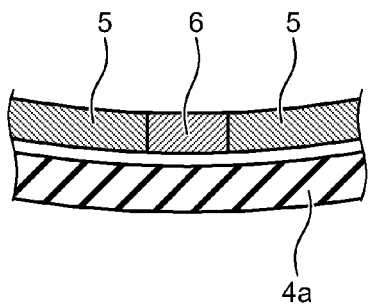
FIGS. 3A and 3B depict a cross sectional configuration of a lower portion of a cylindrical member, where
Figure 3B:
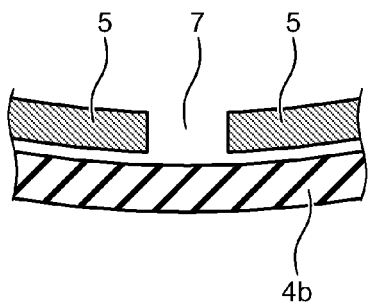

FIGS. 3A and 3B depict a cross sectional configuration of a lower portion of the cylindrical member 5, where FIG. 3A is a horizontal sectional view of a portion shown with P in FIG. 1, and FIG. 3B is a horizontal sectional view of a portion shown with Q in FIG. 1.

As shown in FIG. 3A, at the portion shown with P in FIG. 1, the cylindrical member 5 has the welding portion 6 that joins the opposed ends to each other. The welding portion 6 joins end faces of the opposed ends over its entire length in its thickness direction. FIG. 3A depicts a portion of the core 4a, and a space (a gap) is formed between the core 4a and the cylindrical member 5.

As shown in FIG. 3B, at the portion shown with Q in FIG. 1, the opening 7 is formed between the opposed ends of the cylindrical member 5. In FIG. 3B, a portion of the core 4b is shown, and a space (a gap) is formed between the core 4b and the cylindrical member 5.

A high electric field is generated in a space between the center conductor 2 and the cylindrical member 5 by a current flowing through the center conductor 2. In contrast, an electric field is suppressed in the space between the cylindrical member 5 and the current transformer 4 for instruments and in the opening 7, and a low electric field portion is formed. This is because the cylindrical member 5 functions as a shield against an electric field.

The space between the center conductor 2 and the cylindrical member 5 forms a high electric field portion. Therefore, if metal foreign matters (not shown) such as metal powder enter this space, the metal foreign matters are moved by an effect of the electric field, and this can be a factor that deteriorates dielectric strength of the gas insulated switchgear. Metal foreign matters are introduced when a device is assembled or during an operation of the device, for example.

The metal foreign matters that enter the space between the center conductor 2 and the cylindrical member 5 repeatedly float and fall by an effect of an applied electric field and that of gravity, and fall into the openings 7 in the end. The metal foreign matters fall into a recess (a groove) formed by the openings 7 and an inner bottom surface of the current transformer 4 for instruments, for example. Because the recess (the groove) is a low electric field portion as described above, the metal foreign matters are regulated from floating again, and stay on a bottom of the recess (the groove) (on the inner bottom surface of the current transformer 4 for instruments). That is, the metal foreign matters are trapped in the bottom of the recess (the groove) and rendered harmless.

As described above, in the first embodiment, the cylindrical member 5 is formed into a cylindrical shape by curving the plate-like member, for example, junctions between the ends are the welding portions 6 at the three locations, and the welding portions 6 are arranged on the lower side, and the cylindrical member 5 is arranged in the tank 1. It is only necessary that the cylindrical member 5 has strength as a casing of a current transformer for instruments, it is unnecessary to weld the ends of the cylindrical member 5 over its entire length in the axial direction, and the strength can be maintained even with the partial welding. With this configuration, the openings 7 are formed in the side surface of the cylindrical member 5, and thus, as described above, the cylindrical member 5 can be used for trapping metal foreign matters and functions as a trapping unit.

The cylindrical member 5 is made of aluminum or stainless steel to suppress the generation of heat; however, a cylindrical pipe made of such a material is generally expensive. Therefore, in the first embodiment, the cylindrical body is formed inexpensively by curving the plate-like member and welding the junctions, and the openings 7 formed between the welding portions 6 can be used for trapping metal foreign matters. Because the openings 7 are arranged in the axial direction, it can be expected that the trapping efficiency with respect to the behavior of the metal foreign matters is enhanced.

According to the first embodiment, it is possible to easily form the openings 7 for trapping metal foreign matters while maintaining the strength of the cylindrical member 5, and metal foreign matters mixed in the content of the tank 1 can be efficiently trapped and rendered harmless with the inexpensive configuration.

Because the current transformer 4 for instruments is arranged in the tank 1 to surround the center conductor 2, generally, this can be a factor that increases a diameter of the tank. To reduce the size of the current transformer 4 for instruments and the diameter of the tank, it is necessary to both enhance the insulation performance between the current transformer 4 for instruments and the center conductor 2 and reduce the distance therebetween. Therefore, it is necessary to remove metal foreign matters between the current transformer 4 for instruments and the center conductor 2 and to enhance the insulation performance. According to the first embodiment, because the trapping efficiency of metal foreign matters is enhanced, the diameter of the tank is also reduced.

Although the welding locations are three in FIG. 1, both ends and a plurality of locations therebetween of the cylindrical member 5 can be welded. FIG. 4 is an example of such a configuration, where the welding portions 6 are formed at five locations including the both ends in the axial direction, for example, and the openings 7 are formed at four locations correspondingly. According to this configuration, the strength of the cylindrical member 5 as a casing of a current transformer for instruments is further enhanced.

According to the first embodiment, although the cylindrical member 5 as the casing of the current transformer 4 for instruments has a function as a trapping unit, the device supported by the cylindrical member 5 is not limited to the current transformer 4 for instruments, and other devices can be also supported by the cylindrical member 5. For example, such a device can be a cylindrical device that surrounds the center conductor 2 and that is supported by the cylindrical member 5, and such a device can be a transformer.

FIG. 5 depicts a configuration of a welding portion of a gas insulated switchgear according to a second embodiment of the present invention, corresponding to the portion shown with P in FIG. 1. The configuration of the gas insulated switchgear according to the second embodiment is identical to that of the first embodiment, except for the configuration of the portion shown with P in FIG. 1.

As shown in FIG. 5, in the second embodiment, spacers 9 are interposed between opposed both ends of the cylindrical member 5 in its axial direction, the spacers and the ends are welded to each other at welding locations 11, thereby joining the both ends to each other through the spacers 9. That is, each welding portion 50 of the second embodiment includes the spacers 9 and the welding locations 11. The spacer 9 is a plate-like metal piece having a predetermined length in the axial direction of the cylindrical member 5 and having a substantially constant width, and the spacer 9 is made of the same material as that of the cylindrical member 5.

The thickness of the spacer 9 is set to be substantially the same as that of the cylindrical member 5. The welding locations 11 are provided on both surfaces of the cylindrical member 5, i.e., on the side of the center conductor 2 and on the side of the current transformer 4 for instruments.

The welding portions 50 are formed at both ends and a central portion of the cylindrical member 5 in its axial direction like the configuration shown in FIG. 1, for example, and the welding portions 50 respectively include the spacers 9 having the same width. According to this configuration, the width of the opening 7 formed between the welding portions 50 is substantially constant. It is preferable that the width of the spacer 9 is in a range of 10 to 15 millimeters and the width of the openings 7 is almost the same in terms of the trapping efficiency of metal foreign matters. The welding portions 50 can be provided at a plurality of locations between the both ends in the axial direction like the example shown in FIG. 4.

According to the second embodiment, the cylindrical member 5 is formed in such a manner that the plate-like member is curved into the cylindrical shape, the opposed both ends of the plate-like member are butted against each other, and the spacer 9 is interposed between the opposed both ends, and they are welded to each other. Therefore, the opening 7 is defined by the width of the spacer 9, and it is easy to substantially constantly keep the width of the opening 7 in the axial direction. Particularly, when a plate thickness is large, it is easy to weld by using the spacer 9.

According to the second embodiment, the width of the opening 7 is substantially constant in the axial direction of the cylindrical member 5 by using the spacer 9, the opening 7 having good width-size precision can be obtained, and it is possible to stabilize the trapping performance of metal foreign matters over the axial direction.

Other configurations of the second embodiment are identical to those of the first embodiment shown in FIGS. 1 to 4, and the trapping method of metal foreign matters through the openings 7 according to the second embodiment is also identical to that described above in the first embodiment.

Figure 6:
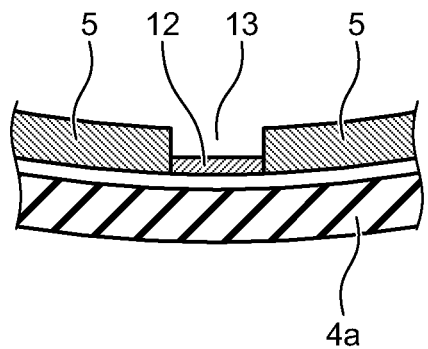
FIG. 6 is a configuration diagram of a welding portion of a gas insulated switchgear according to a third embodiment of the present invention, corresponding to the portion shown with P in FIG. 1.

FIG. 6 depicts a configuration of a welding portion of a gas insulated switchgear according to a third embodiment of the present invention, corresponding to the portion shown with P in FIG. 1.

As shown in FIG. 6, in the third embodiment, circumferentially opposed both ends of the cylindrical member 5 are joined to each other through a welding portion 12 without through the spacer. Unlike the welding portion 6 of the first embodiment, the welding portion 12 does not join the opposed end faces of the cylindrical member 5 over the entire length in its thickness direction, but joins portions of the end faces on the side of the current transformer 4 for instruments (on the side opposite from the center conductor 2). According to this configuration, a groove 13 is formed by an upper surface of the welding portion 12 and the opposed end faces of the cylindrical member 5. Unlike the welding portion 6 of the first embodiment, the welding portion 12 is formed over the entire length of the cylindrical member 5 in its axial direction. Therefore, the groove 13 is formed over the entire length of the cylindrical member 5 in its axial direction.

The groove 13 is formed in a lower portion of the cylindrical member 5, and forms a low electric field portion. Therefore, metal foreign matters that have fallen into the groove 13 are regulated from floating again and rendered harmless.

According to the third embodiment, the cylindrical member 5 is formed in such a manner that a plate-like member is curved into the cylindrical shape, the opposed both ends of the plate-like member are butted against each other, the portions of the end faces on the side of the current transformer 4 for instruments are welded to each other, and the welding portion 12 is formed over the entire length of the cylindrical member 5 in its axial direction. Therefore, it is possible to easily form the groove 13 for trapping metal foreign matters while maintaining the strength of the cylindrical member 5. Other configurations of the third embodiment are identical to those of the first embodiment shown in FIGS. 1 to 4.

Figure 7:
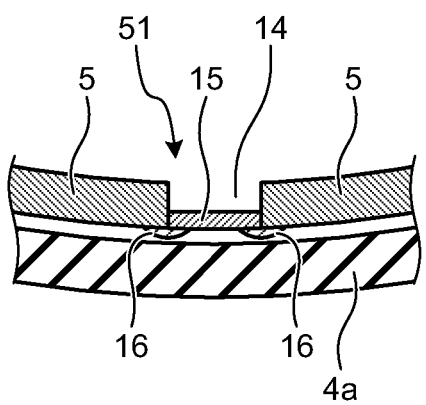
FIG. 7 is a configuration diagram of a welding portion of a gas insulated switchgear according to a fourth embodiment of the present invention, corresponding to the portion shown with P in FIG. 1.

FIG. 7 depicts a configuration of a welding portion of a gas insulated switchgear according to a fourth embodiment of the present invention, corresponding to the portion shown with P in FIG. 1.

As shown in FIG. 7, in the fourth embodiment, a spacer 15 is interposed between circumferentially opposed both ends of the cylindrical member 5, the spacer 15 and the ends are welded to each other at welding locations 16, and the both ends are joined to each other through the spacer 15. That is, a welding portion 51 of the fourth embodiment includes the spacer 15 and the welding locations 16.

The spacer 15 has the same length as that of the cylindrical member 5 in its axial direction that is formed by curving a plate-like member, and the width of the spacer 15 in the circumferential direction is substantially constant. The spacer 15 is a plate-like metal member having a thickness that is smaller than that of the cylindrical member 5, and the material of the spacer 15 is the same as that of the cylindrical member 5.

The spacer 15 abuts against portions of the opposed end faces of the cylindrical member 5 on the side of the current transformer 4 for instruments (on the side opposite from the center conductor 2), and the spacer 15 and the ends are joined to each other at the welding locations 16 on a surface of the spacer 15 on the side of the current transformer 4 for instruments. With this configuration, a groove 14 is formed by an upper surface of the spacer 15 and the opposed end faces of the cylindrical member 5.

Because the spacer 15 has the same length as that of the cylindrical member 5 in its axial direction as described above, the welding portion 51 is formed over the entire length of the cylindrical member 5 in the axial direction unlike the welding portion 6 of the first embodiment. Therefore, the groove 14 is formed over the entire length of the cylindrical member 5 in the axial direction.

The groove 14 is formed in a lower portion of the cylindrical member 5, and forms a low electric field portion. Therefore, metal foreign matters that have fallen into the groove 14 are regulated from floating again and rendered harmless.

According to the fourth embodiment, like in the third embodiment, it is possible to easily form the groove 14 for trapping metal foreign matters while maintaining the strength of the cylindrical member 5. Because the spacer 15 is interposed and welded between the opposed ends of the cylindrical member 5, the width of the groove 14 is substantially constant in the axial direction of the cylindrical member 5, the groove 14 having good width-size precision can be obtained, and the trapping performance of metal foreign matters can be stabilized in the axial direction. Other configurations of the fourth embodiment are identical to those of the first embodiment shown in FIGS. 1 to 4.

Figure 8:
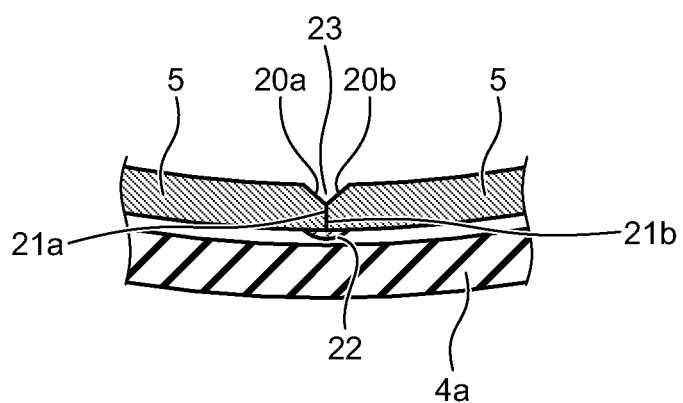
FIG. 8 is a configuration diagram of a welding portion of a gas insulated switchgear according to a fifth embodiment of the present invention, corresponding to the portion shown with P in FIG. 1.

FIG. 8 depicts a configuration of a welding portion of a gas insulated switchgear according to a fifth embodiment of the present invention, corresponding to the portion shown with P in FIG. 1.

As shown in FIG. 8, according to the fifth embodiment, after angle portions of opposed ends of the cylindrical member 5 on the side of the center conductor 2 are chamfered, an end face 21a of one of the ends and an end face 21b of the other of the ends are abutted against each other and in this state, the both ends are joined to each other through a welding portion 22 of a surface of the cylindrical member 5 on the side of the current transformer 4 for instruments (on the side opposite from the center conductor 2). According to this configuration, a groove 23 having a V-shaped cross section is formed by a chamfered portion 20a formed in the one end and a chamfered portion 20b formed in the other end over the entire length of the cylindrical member 5 in its axial direction.

The groove 23 is formed in a lower portion of the cylindrical member 5, and forms a low electric field portion. Therefore, metal foreign matters that have fallen into the groove 23 are regulated from floating again and rendered harmless.

According to the fifth embodiment, the ends of the plate-like member of the cylindrical member 5 are chamfered in advance, the plate-like member is curved into a cylindrical shape, the opposed ends of the plate-like member are butted against and welded to each other, the groove 23 having good width-size precision can be formed over the entire length of the cylindrical member 5 in its axial direction without using a spacer, and the trapping performance of metal foreign matters can be stabilized in the axial direction. Other configurations of the fifth embodiment are identical to those of the first embodiment shown in FIGS. 1 to 4.

Figure 9:
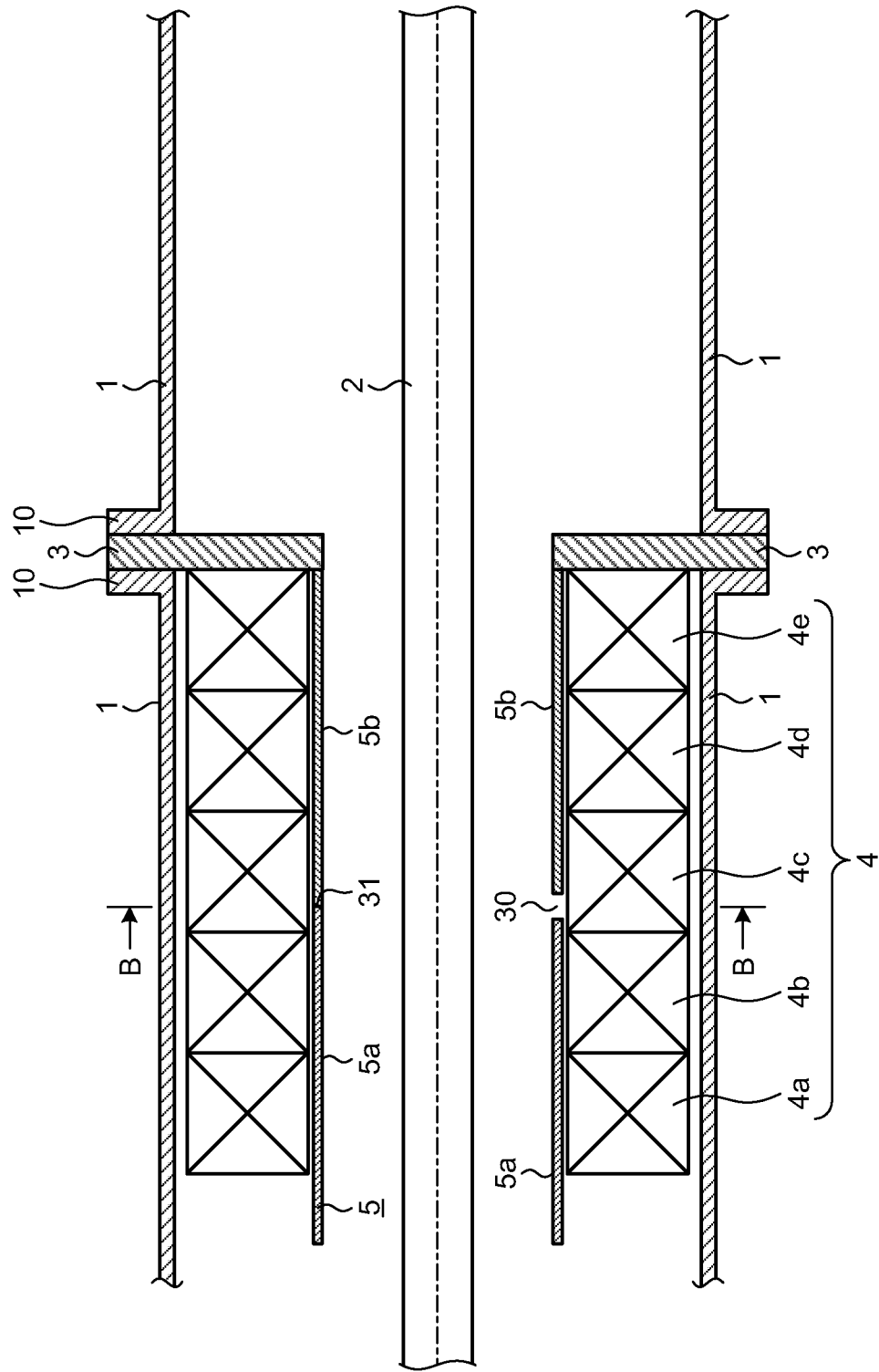
FIG. 9 is a vertical sectional view of a configuration example of a gas insulated switchgear according to a sixth embodiment of the present invention.
Figure 10:
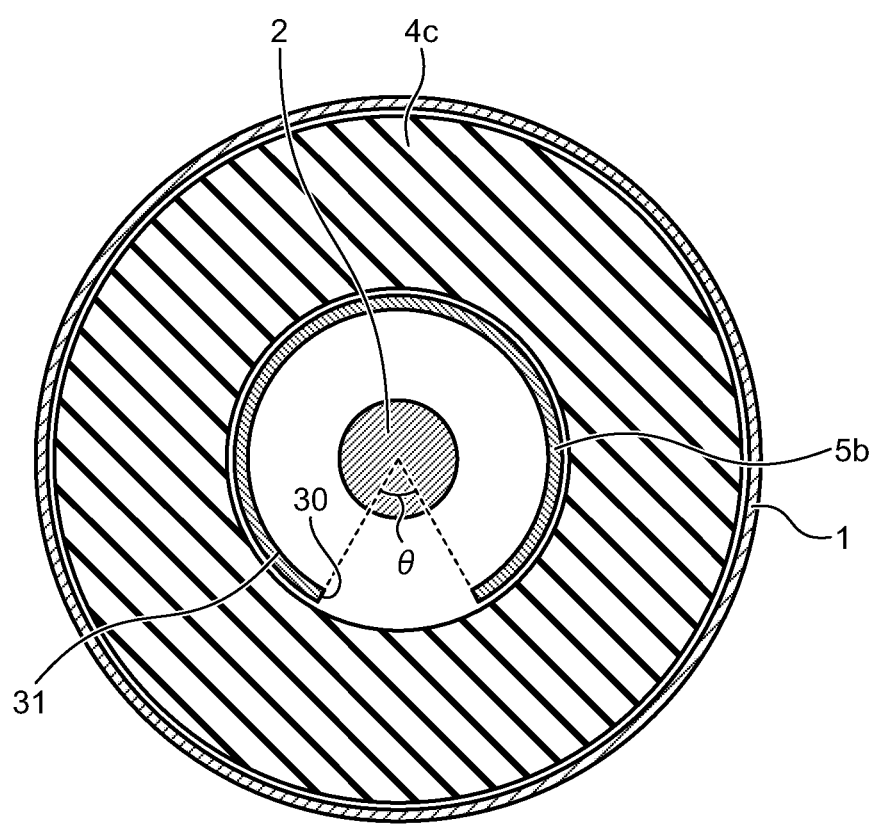
FIG. 10 is a horizontal sectional view taken along a line B-B in FIG. 9.

FIG. 9 is a vertical sectional view of a configuration example of a gas insulated switchgear according to a sixth embodiment of the present invention. FIG. 10 is a horizontal sectional view taken along a line B-B in FIG. 9. In FIGS. 9 and 10, components identical to those shown in FIGS. 1 and 2 are denoted by like reference numerals.

As shown in FIGS. 9 and 10, in the sixth embodiment, the current transformer 4 for instruments includes five ring-like cores 4a to 4e, for example, and the length of the center conductor 2 in its axial direction is longer than that shown in FIG. 1. Because the length of the current transformer 4 for instruments is long in its axial direction, the cylindrical member 5 as a casing of a current transformer for instruments is formed by connecting, with each other, a plurality of cylindrical bodies arranged in the axial direction.

Specifically, the cylindrical member 5 includes two metal cylindrical bodies 5a and 5b, for example, and opposed ends of the cylindrical bodies 5a and 5b are connected to each other by partially welding the ends in a circumferential direction of the cylindrical member 5. By partially welding junctions of the cylindrical bodies 5a and 5b in this manner, an opening 30 is formed.

The opening 30 is formed in a lower portion of the cylindrical member 5 over a predetermined angle range in the circumferential direction. In FIG. 10, an extending range of the opening 30 in the circumferential direction is expressed in an angle θ, and a welding location between the cylindrical bodies 5a and 5b is expressed in a welding portion 31. The opening 30 can be formed such that the length thereof in the circumferential direction becomes longer than the width thereof in the axial direction, for example.

Because a recess (a groove) formed by the opening 30 and an inner bottom surface of the current transformer 4 for instruments forms a low electric field portion, metal foreign matters that have fallen into the recess (a groove) are regulated from floating again and rendered harmless.

The opening 30 is not limited to the example shown in the drawings. For example, a plurality of openings can be formed in the circumferential direction if the opening 30 is formed at least in a lower portion of the cylindrical member 5.

The number of the cylindrical bodies forming the cylindrical member 5 is not limited to the example shown in the drawings, and also when three or more cylindrical bodies are joined to one another, openings can be formed between junctions of the cylindrical bodies in the same manner. The cylindrical bodies 5a and 5b can be formed by curving metal plate-like members into cylindrical shape and welding opposed ends to each other over the entire length in the axial direction.

According to the sixth embodiment, because the cylindrical bodies 5a and 5b are partially welded to form the cylindrical member 5, the opening 30 can be formed in a lower portion of the cylindrical member 5 in the circumferential direction. Therefore, it is possible to easily form the opening 30 for trapping metal foreign matters while maintaining the strength of the cylindrical member 5.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A gas insulated switchgear comprising:
a metal container enclosing insulation gas;
a center conductor through which a current flows, the center conductor being arranged to extend horizontally in the metal container;
a cylindrical member being arranged in the metal container to surround the center conductor, and formed by curving a metal plate-like member into a cylindrical shape and then joining circumferentially opposed both ends of the plate-like member by welding the ends to each other to form a welding portion, the welding portion being located on a lower side of the cylindrical member;
a support member on which one axial direction end of the cylindrical member is mounted, the support member being fixed to the metal container to support the cylindrical member; and a cylindrical device that has the cylindrical member inserted therein and is supported by the cylindrical member, and is arranged to surround the center conductor, wherein openings are formed on the cylindrical member by the welding portion, a plurality of the welding portions that are separated away from each other are formed at least at three locations including both axial direction ends of the cylindrical member, and each of the welding portions includes a metal spacer sandwiched between the circumferentially opposed ends of the plate-like member, and the spacer and the circumferentially opposed ends are welded to each other.

2. A gas insulated switchgear comprising:

a metal container enclosing insulation gas;

a center conductor through which a current flows, the center conductor being arranged to extend horizontally in the metal container;

a cylindrical member being arranged in the metal container to surround the center conductor, and formed by curving a metal plate-like member into a cylindrical shape and then joining circumferentially opposed both ends of the plate-like member by welding the ends to each other to form a welding portion, the welding portion being located on a lower side of the cylindrical member;

a support member on which one axial direction end of the cylindrical member is mounted, the support member being fixed to the metal container to support the cylindrical member; and a cylindrical device that has the cylindrical member inserted therein and is supported by the cylindrical member, and is arranged to surround the center conductor, wherein a groove is formed on a surface, which is on a side of the center conductor, of the cylindrical member by the welding portion, the welding portion is formed over an entire length in an axial direction of the cylindrical member, the welding portion includes a metal spacer sandwiched between the circumferentially opposed ends of the plate-like member, the spacer having a thickness smaller than that of the cylindrical member, the spacer abutting against parts of end faces of the circumferentially opposed ends, on a side opposite from the center conductor, and the spacer and the circumferentially opposed ends being welded to each other at a surface of the cylindrical member on the side opposite from the center conductor.

* * * * *